Figure 1:
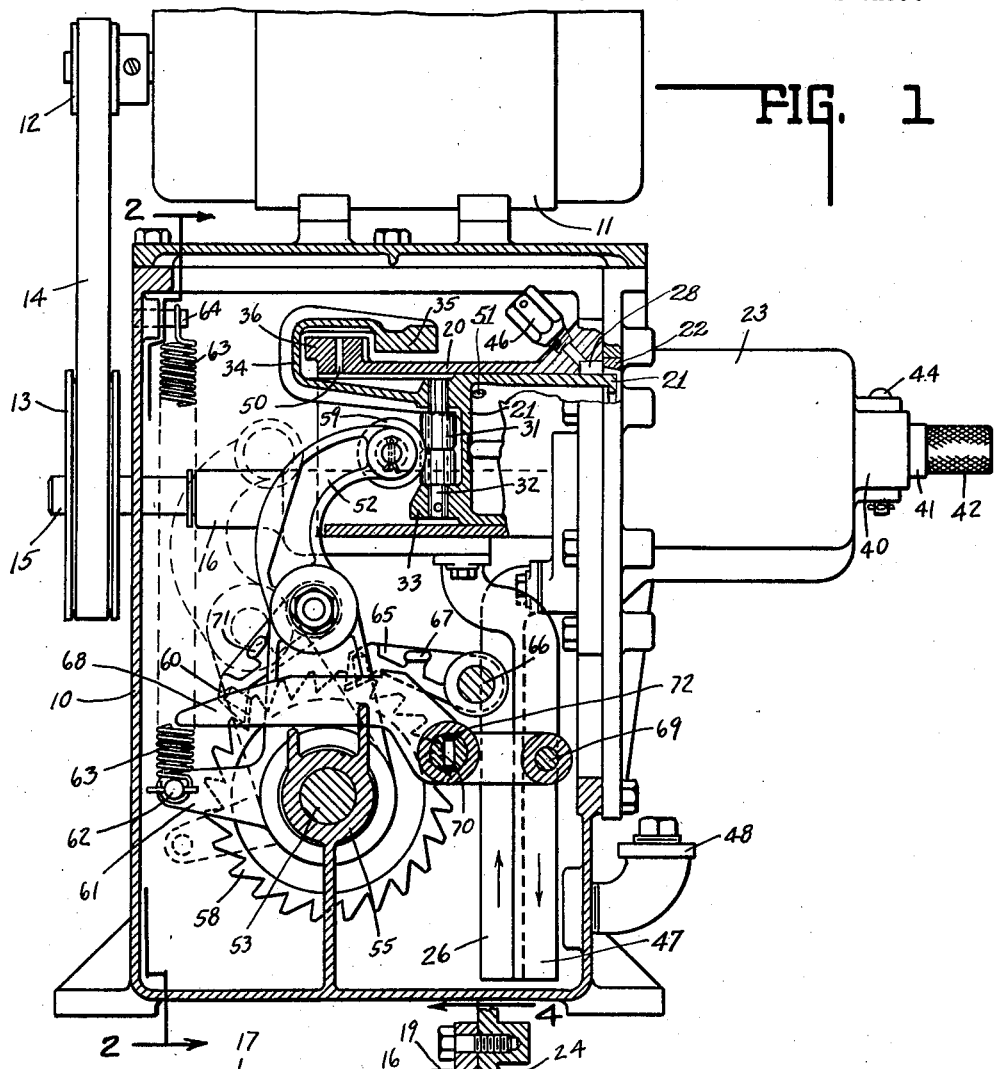

July 31, 1934.   C. J. WINKLER ET AL   1,968,188
HYDRAULIC POWER TRANSMISSION AND TIMING CONTROL THEREFOR
Filed Dec. 21, 1932   3 Sheets-Sheet 1

INVENTORS.
CARL J. WINKLER
HERMAN E. WINKLER.
BY Lockwood Lockwood Goldsmith & Galt
ATTORNEYS.

July 31, 1934.　　C. J. WINKLER ET AL　　1,968,188
HYDRAULIC POWER TRANSMISSION AND TIMING CONTROL THEREFOR
Filed Dec. 21, 1932　　3 Sheets-Sheet 2
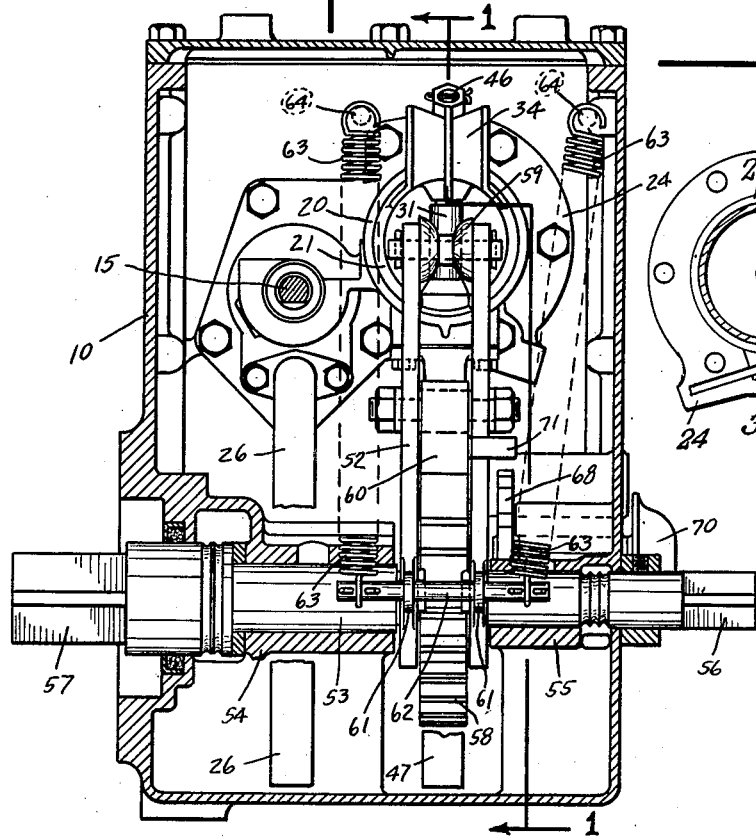
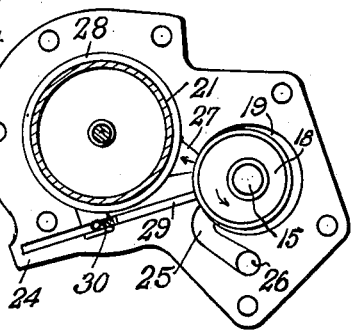
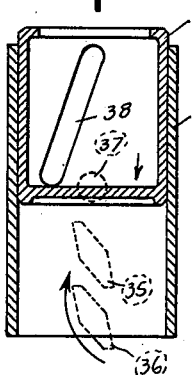
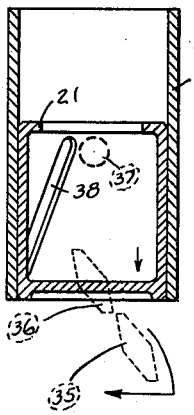
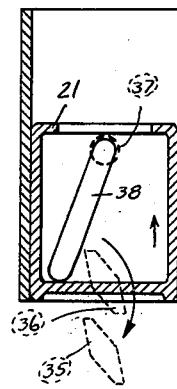
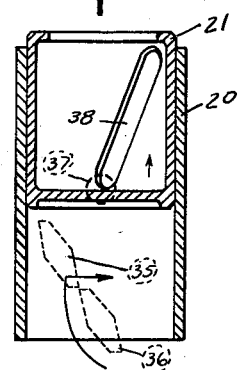
INVENTORS.
CARL J. WINKLER.
HERMAN E. WINKLER.
BY
Lockwood Lockwood Goldsmith & Galt
ATTORNEYS.

July 31, 1934.    C. J. WINKLER ET AL    1,968,188
HYDRAULIC POWER TRANSMISSION AND TIMING CONTROL THEREFOR
Filed Dec. 21, 1932    3 Sheets-Sheet 3

INVENTORS.
CARL J. WINKLER.
HERMAN E. WINKLER.
BY
Lockwood Lockwood Goldsmith & Galt
ATTORNEYS.

Patented July 31, 1934

1,968,188

UNITED STATES PATENT OFFICE 1,968,188

HYDRAULIC POWER TRANSMISSION AND TIMING CONTROL THEREFOR

Carl J. Winkler and Herman E. Winkler, Indianapolis, Ind.

Application December 21, 1932, Serial No. 648,229

19 Claims. (Cl. 60—52)

This invention relates to a hydraulic power transmission and timing control therefor, particularly adaptable for use in imparting a reciprocating movement to the driven element or an intermittent rotary movement thereto, as may be desired. As specifically shown herein, said transmission is designed to impart an intermittent rotary movement, such as to the feed screw of a stoker or the like.

One object of the invention is to provide a transmission of this character which may have a source of power in an electric motor and will increase or amplify the torque, in transmitting power to the driven member.

One feature of the invention resides in the method of transmitting power by the association with a power driven hydraulic pump of a cylinder in which a piston is adapted to reciprocate through the medium of the intake and exhaust of the oil or hydraulic fluid pumped to the cylinder for imparting reciprocating action or intermittent rotary action thereby.

Another feature of the invention resides in the peculiar arrangement of the exhaust valve and its control by the rotary action of the piston in its reciprocating movement whereby, in the employment of a straight, elongated exhaust port or ports in the piston, the exhaust of the hydraulic fluid constantly pumped into the cylinder may be continued during the entire return movement.

A further feature of the invention resides in the method and structural arrangements for imparting the proper oscillatory movement to the piston for accomplishing the foregoing, as will be hereinafter more specifically described.

Another feature resides in the lubrication of the operating parts of the mechanism by an auxiliary exhaust of the oil employed as a hydraulic fluid.

Another feature of the invention resides in the arrangement and construction of the operating connections actuated by the piston to impart intermittent rotary motion to a shaft, such as the screw shaft of a stoker.

Still a further feature resides in the timing control for the piston movement, wherein the rate of supply of the fluid remains constant, by merely varying the fluid capacity of the cylinder.

Figure 3:
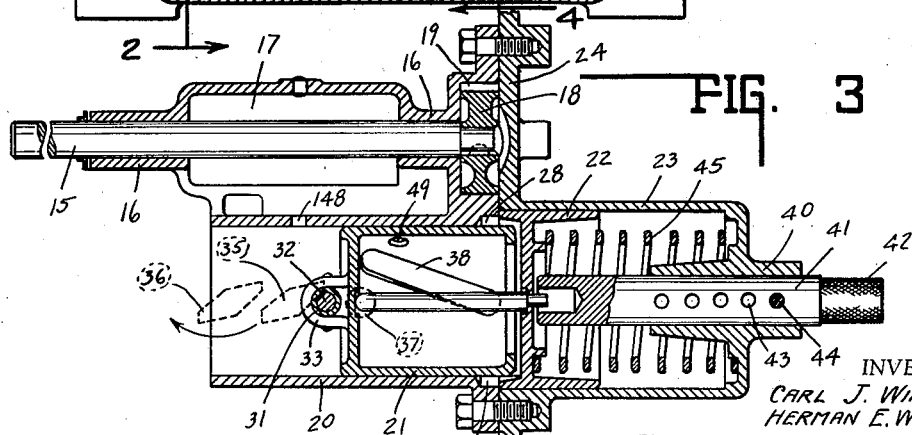
Figure 9:
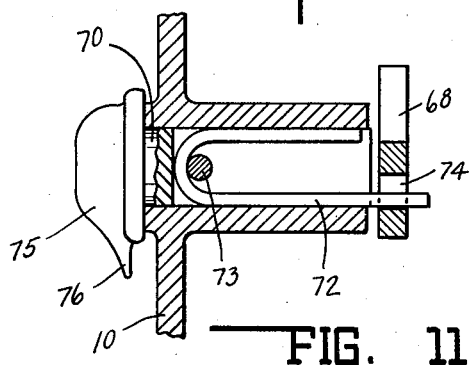
Figure 10:
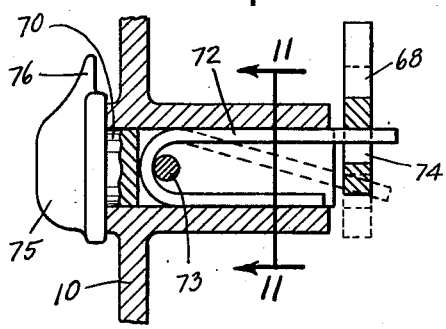
Figure 11:
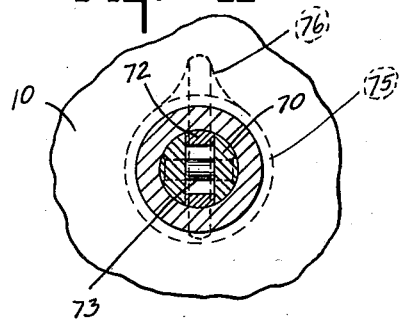
Figure 12:
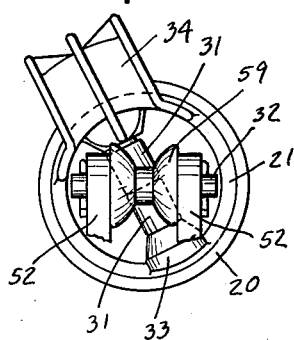
Figure 13:
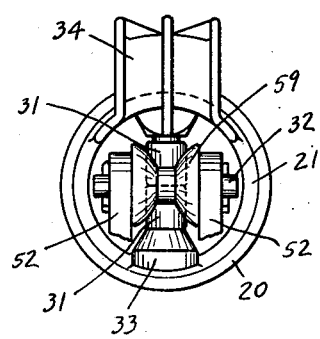
Figure 14:
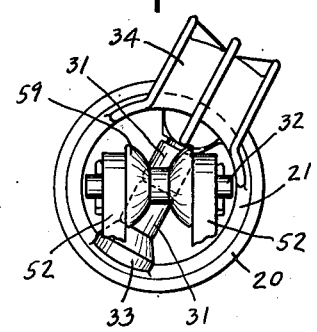

Other objects and features of the invention will be readily apparent from the accompanying drawings and the following description and claims:

Fig. 1 is a side elevation of the mechanism showing parts thereof in section substantially taken on the line 1—1 of Fig. 2. Fig. 2 is an end elevation showing the parts in section taken substantially on the line 2—2 of Fig. 1. Fig. 3 is a central section through the cylinder taken in a substantially horizontal plane, timing control and pump, showing the piston in retracted position. Fig. 4 is a section taken on the line 4—4 of Fig. 3. Fig. 5 is a diagrammatic illustration showing the retracted position of the piston at the start of its power stroke with the exhaust valve closed. Fig. 6 is the same as Fig. 5 showing the same at the end of its power stroke with the exhaust valve closed. Fig. 7 is the same showing it at the start of its exhaust stroke with the exhaust valve open. Fig. 8 is the same showing it in its retracted position with the exhaust valve open at the end of the exhaust stroke. Fig. 9 is a central vertical section through the release control showing it in "on" or non-releasing position. Fig. 10 is the same as Fig. 9 showing it in "off" or releasing position. Fig. 11 is a section taken on the line 11—11 of Fig. 10. Figs. 12, 13 and 14 are views of the roller contacts illustrating their relative positions during the exhaust stroke, end of stroke and power stroke respectively.

In the drawings, there is illustrated a housing 10 in which the mechanism is enclosed and supported. Mounted thereon there is illustrated an electric motor 11 having a pulley 12 driving the pulley 13 through the belt 14. The pulley 13 is keyed to the drive shaft 15 mounted in the elongated bearings 16 having an intermediate oil reservoir 17. Keyed to the shaft 16, there is an eccentrically mounted hydraulic pump head or disc 18 rotated in the annular chamber 19. Associated therewith there is a cylinder 20 in which the piston 21 is adapted to reciprocate, said cylinder being open at its forward end and closed at its rear end by the adjustable plate 22 slidably mounted in the cup 23 which extends rearwardly from and coaxially with the cylinder.

As illustrated in Fig. 3, the chamber 19 is closed by the head 24 which is integral with the cup 23. Formed therein as illustrated in Fig. 4, there is an oil intake passage 25 leading from the oil intake pipe 26 into the chamber 19. A discharge passage 27 is likewise formed in said head leading from the chamber 19 into the enlarged portion or channel 28 formed in the end of the chamber of the cylinder 20. Slidably mounted in a suitable recess formed in said head there is an abutment 29 which is maintained under pressure by the spring 30 against the peripheral surface of the pump head or disc 18 for preventing flow of the oil between the passages 25 and 27.

As illustrated in Figs. 1 and 3, the piston 21 is closed at the forward end and carries thereon rollers 31 rotatably mounted on a pin 32 secured in the forwardly protruding ears 33. The upper of said ears is provided with a U-shaped extension 34 extending forwardly sufficiently to clear the forward end of the cylinder when the piston is in retracted position and then extending rearwardly over the outer surface of the cylinder to support the cam head 35, said cam head moving back and forth with the movement of the piston and being so positioned as to engage in its reciprocating movement the fixed cam head 36 secured on top of the cylinder in its path of movement, thereby imparting an oscillatory rotary motion to the piston.

The cylinder is provided with a main exhaust port 37, while the piston is provided with an elongated slot 38 formed in the wall and extending substantially the full length thereof at an angle to its axis. The other end of the piston is open, in communication with the pressure or intake oil passage 27 and enlarged portion 28 of the cylinder.

The cup-like housing 23 of the timing control is provided with an elongated bearing 40 through which the adjustable plunger or rod 41 extends. Said rod is provided with a knurled handle 42, and a plurality of equally spaced holes 43 adapted to register with the corresponding hole in the bearing 40 through which a pin 44 may extend. Mounted in the chamber of the cup there is a spiral compression spring 45 bearing against the outer end thereof and against the adjustable plate 22, said plate also abutting against the forward end of the rod 41 when the spring is compressed thereby. Communicating with the upper portion of the cylinder there is a blow-off valve indicated at 46 in Fig. 1 for relieving the pressure upon being excessive, such as may be caused by an obstruction to the movement of the piston.

The exhaust port 37 is in communication with the exhaust pipe 47 which extends downwardly to adjacent the bottom of the housing 10 with the intake pipe 26. A filler spout 48 is provided in said casing for filling the same with oil to a level substantially above the lower ends of the pipes 26 and 47. The cylinder, in addition to the main exhaust port 37, is provided with an auxiliary exhaust port 148 with which the port 49 in the piston is adapted to register when the piston reaches its forward position. A second exhaust port 50 is provided adjacent the end of the cylinder with which the port 51 in the piston is adapted to register.

A curved power transmitting lever 52 is pivotally mounted upon the driven shaft 53, which shaft is supported adjacent one side of the housing by the elongated bearing 54 and adjacent the other side thereof by the elongated bearing 55, that portion of the shaft in the bearing 55 being reduced and extending outwardly through the housing terminating in a rectangular portion 56 for receiving a hand crank (not shown). Through the bearing 54 the large portion of the shaft 53 extends through the casing terminating in a rectangular portion 57 for connection with a member to be driven, such as a screw feed for a stoker or the like (not shown). Keyed to said shaft intermediate said bearings there is a ratchet wheel 58. The upper end of said power transmitting lever 52 is provided with a flanged roller 59 adapted to engage the rollers 31 on the piston. Pivotally mounted on the lever intermediate the ends thereof there is a pawl 60 adapted to engage the ratchet 58 for rotating the same counter-clockwise upon the roller end of the lever 52 being moved forwardly or to the left. As illustrated in Fig. 2, said lever is formed in two parts embracing the ratchet 58 and is provided with laterally extending rigid arms 61 through which the pin 62 extends. On each end of the pin 62 there is connected a spring 63, the opposite ends of said springs being connected to the housing at 64.

To prevent back-lashing of the ratchet 58, there is a pawl 65 pivotally mounted to the housing on the stud 66 and provided with a finger 67. The pawl, by its own weight, drops into engagement with the ratchet teeth to prevent reverse or clockwise movement thereof.

For conveniently disconnecting the power transmission from the lever 52 to the ratchet 58, there is provided an intercepting lever 68 pivoted to the housing at 69 and having a connecting bar 70 extending through the casing above the oil level which may be manually operated to lift the same against the projection 71 on the pawl 60 and simultaneously against the finger 67 on the pawl 65 for raising said pawls out of engagement with the ratchet 58 to disconnect the power transmission and permit manual operation by a crank or the like operating on the portion 56 of the shaft 53.

The connecting bar 70 is best illustrated in Figs. 9, 10 and 11. When the shaft 53 is clogged so as to prevent movement such as may occur in the stoker screw feed, the pawl 60 becomes wedged in tightly with the ratchet teeth 58 so as to be locked in operative position. Under such conditions, to attempt to immediately raise the same by turning the bar 70 would involve the danger of breaking or shearing off the connecting bar or associated parts. Therefore, it is connected with the lever 68 through the medium of a U-shaped spring 72 extending into a recessed portion of the bar 70 and locked therein by a pin 73. An elongated end thereof extends through an enlarged opening 74 of the lever 68, and the bar 70 is provided with an external head 75 provided with a pointer 76. Thus when it is desired to disconnect the shaft, the head is turned from the position shown in Fig. 9 to the position shown in Fig. 10. If the lever may be freely raised to disconnect the shaft, it will be actuated by the raising of the elongated arm of the spring 72 as shown in full lines in Fig. 10. If the shaft 53 is clogged and thereby resists raising of the lever, it will cause the spring to assume the position under tension illustrated in dotted lines in Fig. 10. Thereupon, when the shaft is directly agitated, as by a crank on the end 56, so as to free the pawl, the spring tension will raise the lever and maintain the pawl in freed position.

It will be noted from the position of the rollers illustrated in Figs. 12, 13 and 14 that whereas the cams 35 and 36 will oscillate the piston so that the rollers 31 carried thereby will extend at an angle relative to the roller 59, the rollers 31 will at all times seek a central vertical position as illustrated in Figs. 2 and 13. To obviate wear which would occur in the "cocking" of the rollers 31 with respect to the roller 59, they are divided so as to rotate independently and in opposite directions when engaging the opposite bell-shaped faces of the roller 59. Thus the rollers not only perform the function of transmitting power between the piston and the operative parts of the transmission, but further serve to avoid the use of springs or the like for rotating the piston to its central or normal position at the end of each stroke. As illustrated, Fig. 12 shows the position of the rollers during the exhaust stroke, Fig. 14 shows their position during the power stroke, while Fig. 13 shows their normal central position at the end of each stroke, which several positions are the equivalent positions of the piston upon which the rollers 31 are rigidly mounted.

In operation, wherein it is desired to apply an intermittent rotary movement to a screw feed stoker or the like, the electric motor will cause the pump to pump oil into the cylinder which will force the piston forwardly or to the left, against the power transmitting lever 52, which, through the ratchet, will give a short rotary movement to the main driving shaft. The exhaust port thereupon being opened, the springs 63 will return the piston while the position to which the shaft has been moved will remain fixed until the next operation. By utilizing a hydraulic pump, greatly increased torque is transmitted to the shaft and the timing of the power transmission may be conveniently regulated by varying the capacity of the cylinder through the positioning of the rod 41.

In detail, fluid, such as oil, is constantly pumped from the bottom of the housing through the pipe 26 into the pump chamber 19 and constantly forced by the pump 18 into the channel 28 in cylinder 20 and interior of the piston 21. This continuous pumping action results from the driving of the pump by the motor 11. The piston 21 is normally retracted by the tension of the springs 63 through the medium of the lever 52 and the exhaust slot 38 is moved out of registry with the port 37 by reason of the seating of the rollers 31 between the flanges of the roller 59, whereby the piston is held in position with said rollers 31 extending vertically as illustrated in Fig. 1.

As the fluid is pumped into the cylinder and piston, the exhaust ports being closed, the piston will be forced forwardly to the position shown in Fig. 6, forcing with it the lever 52 and rotating the ratchet 58 and shaft 53 counterclockwise. During this forward movement, however, the cam 35 on the piston must pass about the cam 36 on the cylinder. Said cams are so positioned relative to each other that this passage is to the right of the cam 36 which causes the piston to rotate clockwise during its forward movement, as viewed in Fig. 2 which clockwise movement continues to maintain the elongated port 38 clear of the port 37 substantially during the full power stroke of the piston. Immediately upon the cam 35 passing the cam 36, and due to the pressure of the roller 59 on the rollers 31, by reason of the springs 63, the piston, which has been twisted, will be caused to straighten up with the rollers 31 again in vertical position. This will give the piston a sudden counter-clockwise movement, bringing the cams into the position shown in Fig. 7 and the ports 37 and 38 into registry for exhausting the oil to the bottom of the housing through the pipe 47. At the same time, the auxiliary exhaust port 49 will register with the port 148 so as to force some of the oil into the oil reservoir 17 to maintain lubrication of the shaft 15, and likewise the port 51 in the piston will be brought into registry with the port 50 to discharge a small amount of oil onto the cam 36 whereby the surface thereof will be automatically lubricated.

The exhaust ports having registered, the springs 63, through the medium of the lever and rollers, will force the piston back to its retracted position as shown in Fig. 8. During this reverse movement, the cam 35 will pass about the opposite side of the cam 36, rotating the piston counterclockwise during its rearward movement so that the annularly extending elongated port 38 will maintain registry with the port 37 during the entire rearward movement. By thus maintaining constant exhausting of the oil there will be no resistance to the retraction of the piston by the continuous pumping of the oil into the cylinder. Thereupon, the cams having cleared, the pressure exerted by the rollers quickly rotates the piston clockwise to normal central position as indicated in Fig. 5, thus completing the cycle.

As the power stroke of the piston depends upon the rapidity with which the cylinder is filled with oil from the pump, the speed of the pumping action remaining the same, it will follow that an increase or decrease in the capacity of the cylinder will vary the speed in which it is filled and, therefore, the time of movement of the piston. To that end, the position of the sliding plate 22 under pressure may be adjusted by the rod 41 to vary the capacity of the cylinder for varying the time of movement of the piston. Thus, wherein the rod 41 is retracted, while the plate will normally be held in forward position by the spring 45, after the piston and the rear portion of the cylinder are filled with oil, the pressure thereof will press the plate 22 rearwardly compressing the spring 45 until said plate abuts the end of the adjustable rod 41, after which increase in the volume of oil will force the piston forwardly. This variation has to do principally with the timing of the driving operation by the piston rather than the speed of travel thereof.

While the invention has been described as directed toward mechanism transmitting intermittent rotary movement, it will be apparent that the power transmitted by the reciprocal movement of the piston may readily transmit a reciprocatory movement, the above disclosing the means for transmitting the reciprocal movement of the piston to an intermittent rotary movement. In the same manner as is commonly employed and as is well understood in the art, reciprocatory movement of the piston may also be transformed into a rotary driving action through the usual medium of a crank. Although the invention has been shown and described as utilizing a fluid pump, any equivalent supply of fluid under pressure may be employed in the same manner,—wherein pressure is caused to be exerted in the cylinder for forcing the piston outwardly.

The invention claimed is:

1. A hydraulic power transmission including a piston and cylinder, a rotary pump for forcing oil under pressure into said cylinder to actuate said piston, bearings for said pump, and discharge ports in said piston and cylinder adapted to register when said piston and cylinder are in a given relative position for permitting oil to be discharged therefrom to lubricate said bearings.

2. A hydraulic power transmission including a cylinder and piston, means for forcing oil under pressure into said cylinder to actuate said piston, and registering ports in said piston and cylinder for permitting oil to be forced therethrough to the working parts of said transmission upon said piston and cylinder being brought to a predetermined position.

3. A hydraulic power transmission including a cylinder, a piston and a source of fluid pressure for said cylinder, of an exhaust port in said cylinder, said port being controlled by an oscillatory movement of said piston, power transmitting mechanism adapted to be actuated by said piston, means for oscillating said piston, a pair of contacting rollers mounted on said piston and mechanism respectively through which power is transmitted, said rollers being so arranged relative to each other as to normally resist said oscillatory movement and return said piston to intermediate position substantially at the end of each stroke.

4. A hydraulic power transmission including a cylinder, a piston and a source of fluid pressure for said cylinder, of an exhaust port in said cylinder, said port being controlled by an oscillatory movement of said piston, power transmitting mechanism adapted to be actuated by said piston, means for oscillating said piston, and a pair of contacting rollers mounted on said mechanism and piston respectively, one of said rollers being substantially V-shaped and the other roller extending at right angles thereto, said last-mentioned roller comprising two halves for independent relative movement.

5. A hydraulic power transmission including a housing containing a quantity of oil, an electric motor mounted externally thereof, a piston and cylinder mounted therein, an oil pump driven by said motor mounted in said housing adapted to force oil under pressure into said cylinder to actuate said piston, an oil intake extending from below the oil level to said pump, a shaft extending through said housing, a ratchet wheel keyed thereto, a lever fulcrumed on said shaft adapted to be actuated by said piston during the power stroke for engaging and moving said ratchet and shaft in one direction, a spring within said housing connected to said lever for returning it and said piston independently of said ratchet and shaft, an exhaust port for exhausting the oil from said cylinder during the return movement of the piston, and means within said housing operated externally thereof for disconnecting said lever and shaft to permit independent movement thereof.

6. A hydraulic power transmission including a housing containing a quantity of oil, an electric motor mounted externally thereof, a piston and cylinder mounted therein, an oil pump driven by said motor mounted in said housing adapted to force oil under pressure into said cylinder to actuate said piston, an oil intake extending from below the oil level to said pump, a shaft extending through said housing, a ratchet wheel keyed thereto, a lever fulcrumed on said shaft adapted to be actuated by said piston during the power stroke for engaging and moving said ratchet and shaft in one direction, a spring within said housing connected to said lever for returning it and said piston independently of said ratchet and shaft, an exhaust port for exhausting the oil from said cylinder during the return movement of the piston, and adjustable means for varying the capacity of said cylinder to control the timing of the stroke of said piston and movement of said shaft.

7. A hydraulic power transmission including a cylinder, a reciprocating piston operating therein, means for forcing fluid under pressure into said cylinder to actuate said piston, a shaft to be driven, a ratchet on said shaft, a piston operated pawl normally engaged in said ratchet for driving the same, and manually operated means in engagement with said pawl movable into position tending to lift said pawl out of engagement with the ratchet wheel under spring tension.

8. A hydraulic power transmission including a cylinder, a reciprocating piston operating therein, means for forcing fluid under pressure into said cylinder to actuate said piston, a shaft to be driven, a ratchet on said shaft, a piston operated pawl normally engaged in said ratchet for driving the same, and a spring member operatively connected to said pawl for exerting pressure thereon tending to hold said pawl free of the ratchet when released therefrom upon said spring being brought under tension.

9. A hydraulic power transmission including a cylinder, a reciprocating piston operating therein, means for forcing fluid under pressure into said cylinder to actuate said piston, a shaft to be driven, a ratchet on said shaft, a piston operated pawl normally engaged in said ratchet for driving the same, a spring operatively connected with said pawl, and manually operated means for moving said spring to inoperative position for permitting power transmitting engagement between said pawl and ratchet and under tension for yieldingly exerting pressure on said pawl to normally maintain it free of said ratchet.

10. A hydraulic power transmission including a cylinder, a reciprocating piston operating therein, means for forcing fluid under pressure into said cylinder to actuate said piston, a shaft to be driven, a ratchet on shaft, a piston operated pawl normally engaged in said ratchet for driving the same, and manually operable yielding means for exerting spring tension on said pawl to release it from power transmitting engagement with said ratchet.

11. A hydraulic power transmission, including a cylinder, a reciprocating piston operating therein, means for forcing fluid under pressure into said cylinder to actuate said piston, a shaft to be driven, a ratchet on said shaft, a piston operated pawl normally engaged in said ratchet for driving the same, a lever operatively connected with said pawl for supporting it out of engagement with said ratchet, said lever having an enlarged opening therein, a manually rotatable pin having a slot therein, and a spring mounted for moving said lever to pawl elevating position under spring tension.

12. A hydraulic power transmission including a cylinder, a reciprocatory piston adapted to operate therein under fluid pressure, a floating end plate in one end of said cylinder movable to increase the capacity thereof, a spring associated with said plate for resisting said movement, and an adjustable stop therefor for limiting such movement to a predetermined capacity for controlling the timing of the piston.

13. A hydraulic power transmission including a cylinder, a piston movable therein under hydraulic pressure, a cup-like housing mounted on one end of said cylinder, a slidable plate supported in said housing movable to increase the capacity of the cylinder, a plunger slidable in said housing for limiting the movement of said plate, means for adjusting the position of said plunger therein, and a spring surrounding said plunger and engaging said plate for resisting the movement thereof.

14. A hydraulic power transmission including a cylinder, a hollow reciprocatory piston closed at its forward end operated therein for receiving a uniform and constant flow of fluid under pressure adapted to move it through its power stroke, exhaust ports in said piston and cylinder adapted to register for exhausting the fluid at a greater rate than its in-flow, said ports being so arranged as to be out of registry during the entire power stroke and in registry during the entire exhaust stroke, means for oscillating said piston to cause said ports to register at the end of the power stroke, and means for returning said piston through its exhaust stroke upon said ports registering whereby the fluid is substantially exhausted from said piston through said ports irrespective of the continuous in-flow.

15. A hydraulic power transmission including a cylinder, a reciprocating piston operating therein, means for forcing fluid under pressure into said cylinder to actuate said piston, a shaft to be driven, a ratchet on said shaft, a piston-operated pawl normally engaging said ratchet for driving the same, a second pawl normally engaging said ratchet for preventing back lashing, and manually-operated means for engaging said pawls simultaneously so as to free the ratchet therefrom.

16. A hydraulic power transmission including a cylinder, a reciprocating piston operating therein, means for forcing fluid under pressure into said cylinder to actuate said piston, a shaft to be driven, a ratchet on said shaft, a piston-operated pawl normally engaging said ratchet for driving the same, a second pawl normally engaging said ratchet for preventing back lashing, and a manually-operated lever pivotally mounted in position to engage and simultaneously lift said pawls and hold them out of engagement with said ratchet for freeing the same therefrom.

17. A hydraulic power transmission including a housing containing a quantity of oil, an electric motor mounted externally thereof, a piston and cylinder mounted therein, an oil pump driven by said motor mounted in said housing adapted to force oil under pressure into said cylinder to actuate said piston, an oil intake extending from below the oil level to said pump, a shaft extending into said housing, a ratchet wheel keyed thereto, a lever adapted to be actuated by said piston during its power stroke for engaging and moving said ratchet in one direction, means in said housing for returning said piston through its exhaust stroke independently of said ratchet and shaft, means for partially rotating said piston at the end of its power stroke, and an exhaust port opened upon said partial rotation for exhausting the oil from said cylinder during the return movement of the piston.

18. A hydraulic power transmission including a housing containing a quantity of oil, an electric motor mounted externally thereof, a piston and cylinder mounted therein, an oil pump driven by said motor mounted in said housing adapted to force oil under pressure into said cylinder to actuate said piston, an oil intake extending from below the oil level to said pump, a shaft extending into said housing, a ratchet wheel keyed thereto, a lever adapted to be actuated by said piston during its power stroke for engaging and moving said ratchet in one direction, means in said housing for returning said piston through its exhaust stroke independently of said ratchet and shaft, means for partially rotating said piston at the end of its power stroke, an exhaust port opened upon said partial rotation for exhausting the oil from said cylinder during the return movement of the piston, and means externally of said housing for controlling the speed of the piston stroke within the cylinder to vary the duration of its cycle of movement.

19. A hydraulic power transmission including a housing, an electric motor, a source of oil supply, a piston and cylinder mounted in said housing, an oil pump driven by said motor adapted to continuously force oil under pressure into said cylinder to actuate said piston, an oil intake for said pump communicating with said source of oil supply, a shaft extending into said housing, a ratchet wheel keyed thereto, a lever adapted to be actuated by said piston during its power stroke for engaging and moving said ratchet in one direction, means in said housing for returning said piston through its exhaust stroke independently of said ratchet and shaft, means for partially rotating said piston at the end of its power stroke, and an exhaust port opened upon said partial rotation for exhausting the oil from said cylinder during the return movement of the piston.

CARL J. WINKLER.
HERMAN E. WINKLER.